United States Patent [19]

Tjosvold

[11] 4,343,288

[45] Aug. 10, 1982

[54] FURNACE

[76] Inventor: David C. Tjosvold, c/o Wilson Industries, Inc., 2296 Wycliff St., St. Paul, Minn. 55114

[21] Appl. No.: 807,410

[22] Filed: Jun. 17, 1977

[51] Int. Cl.² .............................................. F23L 9/02
[52] U.S. Cl. ..................................... 126/112; 126/77
[58] Field of Search ................................. 126/112, 77

[56]  References Cited
U.S. PATENT DOCUMENTS

| 787,014 | 4/1905 | Twyman | 126/77 |
|---|---|---|---|
| 797,636 | 8/1906 | Stevens . | |
| 866,010 | 9/1907 | Eisenberg | 126/77 |
| 918,823 | 4/1909 | Cahodne | 126/77 |
| 1,041,761 | 10/1912 | Evans . | |
| 1,129,656 | 2/1915 | Evans . | |
| 1,167,845 | 1/1916 | Russell et al. . | |
| 1,430,936 | 10/1922 | Brunner . | |
| 1,465,426 | 8/1923 | Espenschied . | |
| 1,604,569 | 10/1926 | Hammick . | |
| 1,714,649 | 5/1929 | Walouke | 126/112 |
| 1,760,183 | 5/1930 | Swift . | |
| 1,957,544 | 5/1934 | Klemme | 126/77 |
| 3,168,088 | 2/1965 | Martin et al. | 126/77 |
| 3,237,622 | 3/1966 | Best | 126/77 |

Primary Examiner—Irwin C. Cohen
Attorney, Agent, or Firm—Warren A. Sturm

[57] ABSTRACT

A furnace for the burning of wood in a combustion chamber to generate heat. Primary air is brought in at a grate level of the furnace. Secondary air is brought in through a secondary air inlet, past a preheat chamber and through a secondary air duct to be expelled through holes in the secondary air duct at the top level of flames. The secondary air is preheated in the preheat chamber which is located between the combustion chamber of the furnace and the outside air inlet. A heat exchanger in the top of the oven transfers the heat from the combustion chamber of the furnace to ductwork for distribution.

1 Claim, 3 Drawing Figures

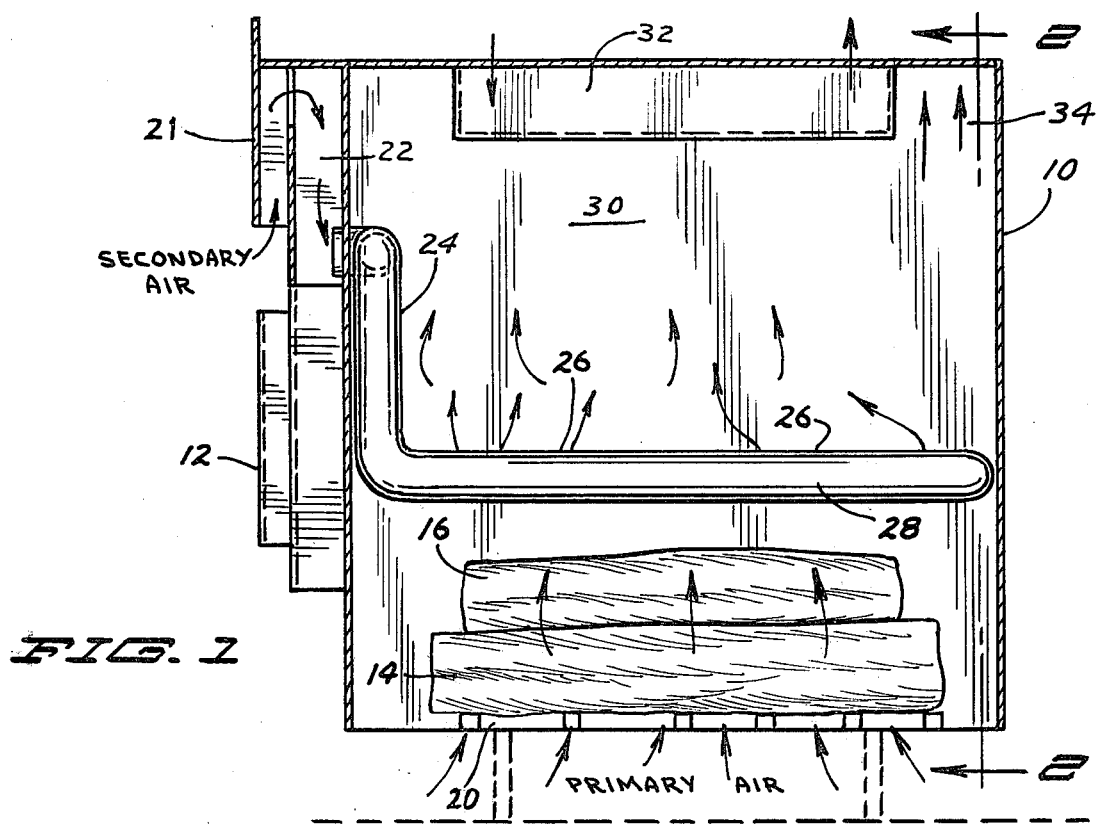
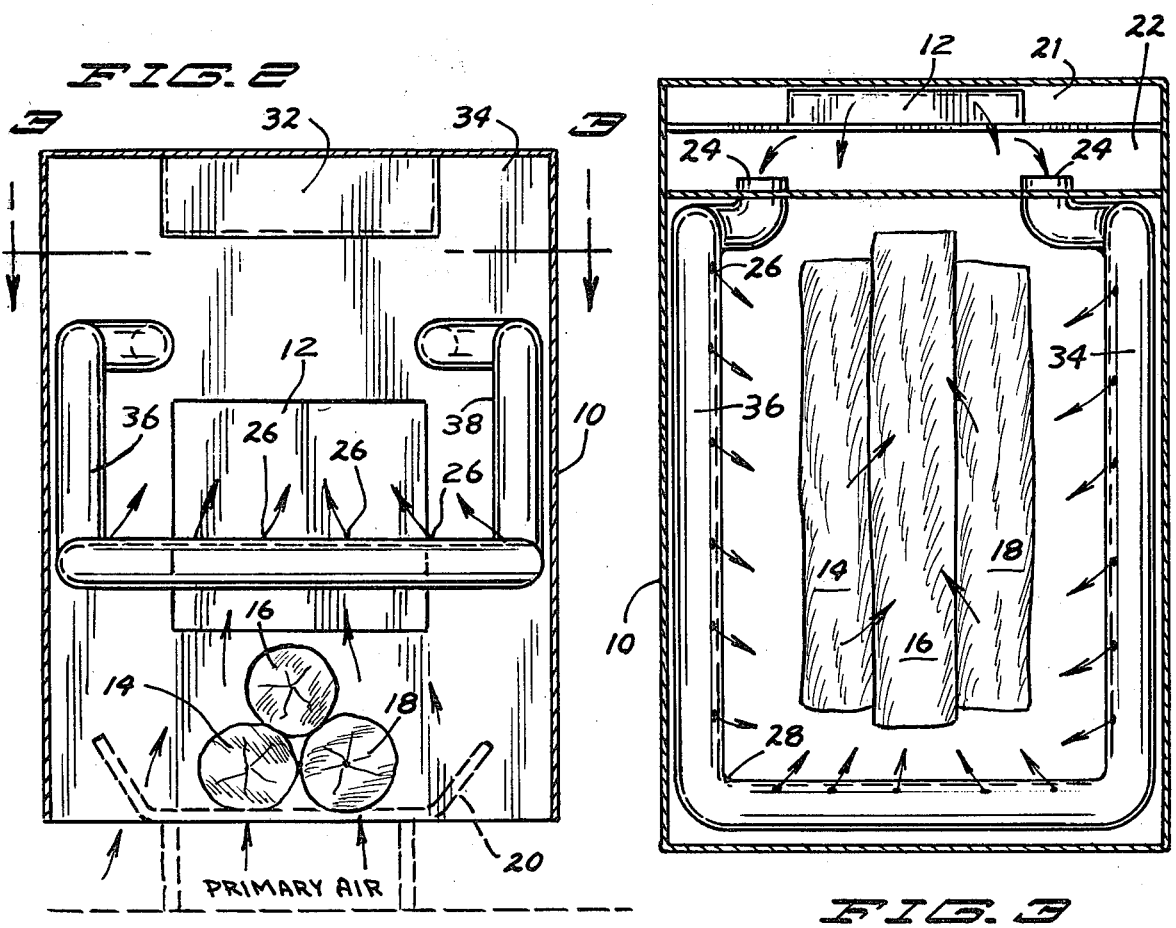

FURNACE

BACKGROUND OF THE INVENTION

1. Field of the Invention

The present invention relates generally to improvements in a wood furnace, and more particularly, pertains to a new and improved furnace which preheats secondary air before expelling the secondary air into the top level of the flame of the fire.

2. Description of the Prior Art

Those concerned with the development of furnaces have long recognized the need for a furance which ignites a high percentage of the gases in the fire and operates with a high combustion efficiency. The present invention fills this need.

Prior art furnaces in the past have failed to completely ignite all of the gases being expelled from the combustion chamber of the furnace into the smoke pipe. Such furnaces have been unsatisfactory in that more fuel is required to generate heat resulting in lower efficiency. If all of the gases in the combustion chamber were to be ignited, less fuel would be required to generate the same amount of heat increased efficiency.

The problem in the art with introducing secondary air into the combustion chamber of the furnace to ignite the uncombusted gases is that the temperature of the secondary air being introduced into the combustion chamber is not sufficient to ignite the gases. On account of this factor, a large percentage of gases leave the combustion chamber unburned for the reason of the temperature in the combustion chamber not being high enough to ignite all the gases.

Prior art patents issued to Brunner, U.S. Pat. No. 1,430,936 and to Swift, U.S. Pat. No. 1,760,183, disclose apparatus for introducing secondary air into the combustion chamber of a furnace.

SUMMARY OF THE INVENTION

The present invention obviates the foregoing disadvantages of prior art furnaces by providing a preheat chamber for secondary air in the upper portion of a furnace and adjacent to the combustion chamber and a secondary air duct to distribute the preheated secondary air increasing the efficiency of combustion of unignited gases.

According to one embodiment of the present invention, there is provided a furnace with a combustion chamber, a grate at the level bottom of the chamber through which primary air is drawn to support a wood fire, and inlet through which secondary air is drawn, the secondary air passing through a preheat chamber and into a secondary air duct which surrounds the combustion chamber at the flame level of the fire whereby the preheated air is equally distributed in the combustion chamber by the secondary air duct so that there is an increased efficiency of combustion of unburned gases.

Having briefly described the embodiment of the present invention, it is a principal object thereof to provide a new and improved furnace with a preheat chamber for secondary air for a furnace.

An object of the present invention is to provide a furnace with a primary air inlet and a secondary air inlet.

Another object of the invention is to provide a preheat chamber to heat the secondary air after its intake into the furnace but before it is discharged into the combustion area of the furnace.

A further object of the invention is to provide a U-shaped secondary air duct structure to equally distribute the preheated secondary air in the combustion area at the top of the flame of the fire to ignite all of the unburned gases.

A significant aspect and feature of the present invention is a furnace which preheats the secondary air in a preheat chamber and equally distributes the secondary air in the combustion chamber so that the secondary air has a high temperature necessary to ignite all the unburned gases thereby increasing the efficiency of combustion of the wood.

BRIEF DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a side view of the preferred embodiment of a furnace, the invention;

FIG. 2 illustrates a rear view of the furnce taken on line 2—2 of FIG. 1; and

FIG. 3 illustrates a top view of the furnace taken on line 3—3 of FIG. 2.

DESCRIPTION OF THE PREFERRED EMBODIMENT

FIG. 1 illustrates a side view of the preferred embodiment of the furnace 10, the invention. A fire door 12 on the front of the oven 10 permits wood logs 14, 16 and 18 to be inserted into the furnace 10. A grate 20 in the bottom of the furnace 10 permits primary air to be brought into the furnace 10 from an outside source which may be a duct if so desired, and further permits ashes to fall through the grate 20 for collection by any well known means in the art.

Secondary air is brought into through a secondary air inlet 21, past a preheat chamber 22 adjacent a wall of a combustion chamber 30, and piped into a secondary air duct 24. The preheat chamber 22 is usually located in an upper wall of the furnace, but may be placed anywhere on the furnace for maximum heat transfer and may take any physical shape. The secondary air duct 24 takes the shape as shown in the figures and is provided with a plurality of holes 26 in the U-shaped portion 28 of the secondary air duct 24. The surface area percentage opening of the holes all the way around the three legs of the U-shaped portion of the secondary air duct 24 is 20% that of the surface area of the primary air inlet at the grate level 20. The secondary air is discharged and equally distributed at the top of the flame in the combustion chamber 30. A heat exchanger 32 transfers the heat in the combustion chamber 30 to air which is ducted accordingly. A smoke pipe 34 removes the combusted and ignited gases from the combustion chamber 30 and exhausts the gases to the outside environment through ductwork accordingly.

FIG. 2 illustrates a rear view of the furnace 10 taken on line 2—2 of FIG. 1 showing wood logs 14, 16, 18; grate level 20; the introduction of primary air; the secondary air duct 24; and holes 26 in the U-shaped portion 28 of the secondary air duct 24. The secondary air is discharged through holes 26 in the U-shaped portion 28 of the secondary air duct 24 at the level of the top of the flames from the logs 14 through 18. Vertical tubes 36 and 38 connect the secondary air duct 24 to the preheat chamber 22 and have a length such that the holes 26 discharge preheated secondary air at the top of the flame from the logs 14–18. By discharging the preheated secondary air at the top level of the flames, the total ignition of unburned gases occurs resulting in an increased efficiency of combustion internal to the furnace 10 in the combustion chamber 30.

FIG. 3 illustrates a top view of the furnace taken on line 3—3 of FIG. 2 showing the wood logs 14–18 in the furnace 10, the secondary air inlet 21, the preheat chamber 22, and the holes 26 in the U-shaped portion 28 of the secondary air inlet 24.

PREFERRED MODE OF OPERATION

Referring now to the drawings, particularly FIG. 1, primary air and secondary air is introduced into the furnace 10 at the grate 20 and the secondary air inlet 21, respectively. Primary air is introduced from the bottom of the grate 20 or ducted in from the front of the furnace 10 to the bottom of the grate 20 to be passed up through the grate 20 into the fire of the wood logs 14–18. Below the grate 20 is an ash pit and fire bricks surround the lower portion of the combustion chamber 30 which supports the combustion of the wood. Secondary air which is induced into the furnace 10 is brought in through the secondary air inlet 21 and is preheated to a temperature above ambient temperature of the air in the preheat chamber 22. The preheat chamber 22 takes its heat from the combustion chamber 26 through heat transfer and as air is passed from the secondary air inlet 20 through the preheat chamber 22, the secondary air rises from ambient temperature to a higher temperature necessary for the total ignition of uncombusted gases in the combustion chamber 26. From the preheat chamber 22, the secondary air is passed into the secondary air duct 24 which is a U-shaped tube 28 surrounding the three sides of the furnace 10 and having a plurality of holes 26 drilled into the secondary air duct 24 tube such that the surface area of the holes 26 is equal to 20% of the primary air surface area of the grate 20. The preheated secondary air is discharged through the holes 26 into the combustion chamber 30 at the level of the fire of the wood logs 14–18 to provide for total ignition of unburned gases thereby increasing the efficiency of the combustion.

It is an important feature of the invention that the secondary air be equally distributed within the combustion chamber 26 by the holes 26 in the U-shaped portion 28 of the secondary air duct 24 for maximum efficiency of combustion of unignited gases.

Various modifications can be made to the furnace of the present invention without departing from the apparent scope thereof. While "20%" has been determined to be the ideal ratio of the surface area of the holes in the secondary air duct to be to the primary surface, it is recognized that a deviation of plus or minus from the percentage figure is permissable while achieving almost the same efficiency as disclosed.

Having thus described the invention, what is claimed is:

1. A furnace for the combustion of wood comprising:
   a. combustion chamber means including four sidewalls, a top and a bottom;
   b. grate means at the bottom of said combustion chamber means introducing primary air to said combustion chamber means;
   c. secondary air inlet means contourly positioned adjacent a sidewall of said combustion chamber means;
   d. preheat chamber means adjacent the top of said combustion chamber means and including a wall in common with an outer surface of an upper portion of said sidewall of said combustion chamber for preheating secondary air from said secondary air inlet means, and;
   e. means in said combustion chamber means equally distributing said preheated secondary air to the top level of flames in said combustion chamber means, said preheat secondary distribution means including a U-shaped duct contoured closely adjacent all of said other sidewalls, positioned below said secondary air inlet means, and including a plurality of generally, inwardly directed holes, vertical tubes connected to and positioned above the ends of said U-shaped duct, and closely adjacent said sidewall, means connecting said preheat chamber means to said vertical tubes, and the integrated area of said holes having an area equal to substantially twenty percent of the area of said primary air inlet means whereby the introduction of said preheated secondary air thereby increases the efficiency of combustion and ignition of unburned gases in said combustion chamber means.

* * * * *